United States Patent
Logaraj et al.

(10) Patent No.: US 6,194,472 B1
(45) Date of Patent: *Feb. 27, 2001

(54) PETROLEUM HYDROCARBON IN WATER COLLOIDAL DISPERSION

(75) Inventors: Sundaram Logaraj, Waco; Thomas J. Ernzen, Lorena, both of TX (US); Moon-Sun Lin, Hsinchu (TW); Antonio C. Ng, Hewitt, TX (US); Todd Lesley Hays, Waco, TX (US); Calvin Lynn Stegemoeller, Hewitt, TX (US); Li Feng, Palatine, IL (US); Mark Aldrich Stroder, Frost, TX (US)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/243,720

(22) Filed: Feb. 3, 1999

Related U.S. Application Data

(60) Provisional application No. 60/080,416, filed on Apr. 2, 1998.

(51) Int. Cl.$^7$ .............................. B01F 3/10; B01F 15/02; B01F 17/18; C09D 195/00
(52) U.S. Cl. ............................. 516/43; 44/301; 106/277; 366/184; 366/348; 516/47; 516/926; 516/928
(58) Field of Search ............................. 516/43, 47, 926, 516/928; 106/277; 366/184, 348; 44/301

(56) References Cited

U.S. PATENT DOCUMENTS

| | | | |
|---|---|---|---|
| 1,663,652 | * 3/1928 | Gundlach | 516/47 X |
| 1,807,808 | * 6/1931 | Symons | 516/47 |
| 1,851,176 | * 3/1932 | Harvey | 106/277 X |
| 2,021,143 | * 11/1935 | Calcott et al. | 516/926 X |
| 3,418,249 | * 12/1968 | Pitchford | 106/277 X |
| 3,497,371 | 2/1970 | Chang | 106/277 |
| 3,519,006 | 7/1970 | Simon | 137/13 |
| 3,630,953 | 12/1971 | Whittier et al. . | |
| 3,891,586 | 6/1975 | Califano et al. . | |
| 3,946,994 | * 3/1976 | Mertz et al. | 366/184 X |
| 3,997,398 | 12/1976 | Zajic et al. | 195/28 R |
| 4,030,894 | 6/1977 | Marlin et al. | 44/51 |
| 4,193,815 | 3/1980 | Burris | 106/202 |
| 4,265,264 | 5/1981 | Sifferman | 137/13 |
| 4,298,397 | 11/1981 | Burris | 106/274 |
| 4,455,149 | 6/1984 | Satake et al. | 44/51 |
| 4,479,806 | 10/1984 | Funk | 44/51 |
| 4,618,348 | 10/1986 | Hayes et al. | 44/51 |
| 4,629,511 | * 12/1986 | Vanderzanden | 516/47 X |
| 4,666,457 | 5/1987 | Hayes et al. | 44/51 |
| 4,762,565 | * 8/1988 | Graf | 516/43 X |
| 4,776,977 | 10/1988 | Taylor . | |
| 4,793,826 | 12/1988 | Hayes et al. | 44/51 |
| 4,821,757 | 4/1989 | Hayes et al. | 137/13 |
| 4,832,747 | 5/1989 | Marchal | 106/277 |
| 4,923,483 | 5/1990 | Layrisse et al. | 44/51 |
| 4,943,390 | 7/1990 | Hayes et al. . | |
| 4,978,365 | 12/1990 | Gregoli et al. | 44/301 |
| 5,000,757 | 3/1991 | Puttock et al. | 44/301 |
| 5,000,872 | 3/1991 | Olah . | |
| 5,024,676 | 6/1991 | Moriyama et al. | 44/301 |
| 5,236,624 | * 8/1993 | Lepert et al. | 516/928 X |
| 5,399,293 | 3/1995 | Numez et al. . | |
| 5,407,476 | 4/1995 | Shuey et al. | 106/216 |
| 5,411,558 | 5/1995 | Taniguchi et al. | 44/301 |
| 5,478,365 | 12/1995 | Nikanjam et al. | 44/280 |

FOREIGN PATENT DOCUMENTS

| | | | |
|---|---|---|---|
| 0 111 983 | 6/1984 | (EP) | C08L/95/00 |
| 0 732 376 | 9/1996 | (EP) | C08L/95/00 |
| 0 794 243 | 9/1997 | (EP) | C10L/1/32 |
| 2 109 333 | 5/1972 | (FR) | C08H/13/00 |
| 2 291 259 | 6/1976 | (FR) | C09D/3/24 |

OTHER PUBLICATIONS

International Search Report, dated Aug. 18, 1999.
Abstract, 60166391, dated Aug. 29, 1985.
Derwent Abstract, 90–034473/05, Dec. 19, 1989.
Derwent Abstract, 90–061215/09, Jan. 12, 1990.
Derwent Abstract, 90–166655/22, Apr. 18, 1990.
Derwent Abstract, 90–328580/44, Oct. 25, 1990.
Derwent Abstract, 91–161150/22, Apr. 23, 1991.
Derwent Abstract, 91–161151/22, Apr. 23, 1991.
Derwent Abstract, 93–068230/09, Feb. 25, 1993.
Derwent Abstract, 94–059260/08, Mar. 9, 1994.
Derwent Abstract, 94–065655/08, Feb. 17, 1994.
Derwent Abstract, 94–094952/12, Feb. 15, 1994.
Derwent Abstract, 94–146184/18, May 4, 1994.
Derwent Abstract, 94–164259/20, Apr. 19, 1994.
Derwent Abstract, 94–167989/21, Mar. 9, 1994.
Derwent Abstract, 94–210802/26, Jul. 20, 1994.
Derwent Abstract, 95–094082/13, Jan. 20, 1995.
Derwent Abstract, 95–126312/17, Feb. 22, 1995.
Derwent Abstract, 95–145115/19, Mar. 14, 1995.
Derwent Abstract, 95–151901/20, Mar. 20, 1995.
Derwent Abstract, 95–151902/20, Mar. 20, 1995.
Derwent Abstract, 83–780695/40, Aug. 30, 1983.
Derwent Abstract, 84–155140/25, May 11, 1984.
Derwent Abstract, 90–204938/27, May 24, 1990.
Derwent Abstract, 94–144829/18, Mar. 22, 1994.
Derwent Abstract, 84–272420/44, Sep. 19, 1984.
Derwent Abstract, 84–284609/46, Oct. 3, 1984.
Derwent Abstract, 84–287896/46, Oct. 30, 1984.
Derwent Abstract, 84–291425/47, Oct. 12, 1984.

(List continued on next page.)

*Primary Examiner*—Richard D. Lovering
(74) *Attorney, Agent, or Firm*—Louis A. Morris

(57) ABSTRACT

A composition of a hydrocarbon in water colloidal dispersion including hydrocarbon particles having a mean softening point exceeding 95° C., a water soluble dispersion agent and water, process and apparatus for the production thereof are disclosed. These dispersions have a median particle size below about 4.5 microns and 90% of the hydrocarbon particles have a size less than about 60 microns. These dispersions are storage stable, stable towards transportation, and can be pumped without destabilizing.

16 Claims, 1 Drawing Sheet

OTHER PUBLICATIONS

Derwent Abstract, 84–297468/48, Oct. 19, 1984.
Derwent Abstract, 84–308559/50, Nov. 2, 1984.
Derwent Abstract, 85–122416/20, May 9, 1985.
Derwent Abstract, 85–160344/27, Jun. 27, 1985.
Derwent Abstract, 85–299704/48, Oct. 18, 1985.
Derwent Abstract, 86–101815/16, Apr. 16, 1986.
Derwent Abstract, 86–183503/29, Mar. 19, 1986.
Derwent Abstract, 87–099176/14, Mar. 3, 1987.
Derwent Abstract, 87–122733/17, Apr. 23, 1987.
Derwent Abstract, 94–211014/26, May 27, 1994.
Derwent Abstract, 87–129547/19, Apr. 23, 1987.
Derwent Abstract, 87–252484/36, Jul. 29, 1987.
Derwent Abstract, 88–332265/47, Nov. 23, 1988.
Derwent Abstract, 89–330174/45, Oct. 3, 1989.
Derwent Abstract, 89–337195/46, Oct. 9, 1989.
Derwent Abstract, 89–374183/51, Nov. 10, 1989.
Derwent Abstract, 90–017401/03, Oct. 17, 1990.
Derwent Abstract, 90–034470/05, Dec. 19, 1989.
Derwent Abstract, 90–034471/05, Dec. 19, 1989.
Derwent Abstract, 90–034472/05, Dec. 19, 1989.
Derwent Abstract, 94–281940/35, Sep. 21, 1994.
Derwent Abstract, 94–347374/43, Sep. 27, 1994.
Derwent Abstract, 95–094083/13, Jan. 20, 1995.
Derwent Abstract, 95–16095/21, Apr. 18, 1995.
Derwent Abstract, 76–64242X, Jul. 10, 1976.
Derwent Abstract, 77–46702Y, Jun. 21, 1977.
Derwent Abstract, 77–52847Y, Jun. 10, 1977.
Derwent Abstract, 77–52848Y, Jun. 10, 1977.
Derwent Abstract, 77–52849Y, Jun. 10, 1977.
Derwent Abstract, 77–53196Y, Jun. 15, 1977.
Derwent Abstract, 77–62021Y, Jul. 18, 1977.
Derwent Abstract, 77–76647Y, Sep. 13, 1977.
Derwent Abstract, 77–76648Y, Sep. 13, 1977.
Derwent Abstract, 78–07472A, Dec. 9, 1977.
Derwent Abstract, 78–59053A, Aug. 10, 1978.
Derwent Abstract, 80–53840C, Jul. 24, 1980.
Derwent Abstract, 82–93005E, Oct. 27, 1982.
Derwent Abstract, 94–211015/26, May 27, 1994.
Derwent Abstract, 81–87064D, Nov. 3, 1981.

* cited by examiner

PETROLEUM HYDROCARBON IN WATER COLLOIDAL DISPERSION

BACKGROUND OF THE INVENTION

The present application claims priority of U.S. Provisional Patent Application Ser. No. 60/080,416, filed on Apr. 2, 1998.

FIELD OF THE INVENTION

The present invention relates to high mean softening point hydrocarbon in water colloidal dispersion and a method for the production thereof. The above mentioned hydrocarbons are the products derived from natural sources such as petroleum and coal which may contain minor amounts of non hydrocarbon material and/or polymers and resins. In particular, the present invention relates to a hydrocarbon in water colloidal dispersion including petroleum hydrocarbon particles having a mean softening point exceeding 95° C. and a method for the production thereof which includes high shear mixing of the hydrocarbons, a dispersion agent and water under conditions of elevated temperature and pressure.

DESCRIPTION OF THE RELATED ART

There are many patents describing the emulsification of viscous petroleum hydrocarbons in water. The main purpose is to reduce viscosity so that the petroleum hydrocarbon can be converted into a liquid form which is easier to handle and transport. Using abundant water as one of the ingredients in preparing these dispersions makes these emulsification processes very attractive. Predominantly nonionic or anionic surfactant packages have been used and in some cases cationic surfactants have been used. The surfactant solution in water and the heated petroleum hydrocarbon are brought in contact and subjected to shearing action using a suitable mixing device. Various mixing devices have been used such as simple blenders, gear pumps, colloidal mills, static mixers, and dynamic mixers. Most of the patents describe emulsification of hydrocarbons at ambient pressures. The petroleum hydrocarbons used in these processes include vacuum residues, atmospheric residues, crude oils, etc. The following list is of examples of such patents:
U.S. Pat. No. 5,411,558
U.S. Pat. No. 5,399,293
U.S. Pat. No. 5,024,676
U.S. Pat. No. 5,000,872
U.S. Pat. No. 4,978,365
U.S. Pat. No. 4,923,483
U.S. Pat. No. 4,821,757
U.S. Pat. No. 4,793,826
U.S. Pat. No. 4,666,457
U.S. Pat. No. 4,618,348
U.S. Pat. No. 4,265,264
U.S. Pat. No. 4,776,977
U.S. Pat. No. 3,997,398
U.S. Pat. No. 3,630,953
U.S. Pat. No. 3,519,006
U.S. Pat. No. 3,497,371

There are a few patents describing emulsification under higher temperatures and pressures. If the hydrocarbon is too viscous it has to be heated to a certain temperature which results in the temperature of the mix consisting of surfactant solution and the petroleum hydrocarbon to be much higher than the boiling point of water. When the temperature is higher than the boiling point of water the system needs to be at higher pressures to prevent water from boiling off and cooling systems are necessary to cool the emulsions below the boiling point of water before the pressures can be released. The examples in these patents indicate that the hardest material that has been emulsified had a mean softening point of about 50° C. and in another example had a viscosity of 1000 cps at 100° C. When hydrocarbons having a mean softening point above 50° C. were used they were either diluted with fluxant oils, softened with solvent, or were powdered and made into a slurry with softer hydrocarbon emulsions, in all cases resulting in hydrocarbon particles in the emulsion having mean softening points below 50° C. The following is a list of examples of such patents:
U.S. Pat. No. 4,943,390
U.S. Pat. No. 4,832,747
U.S. Pat. No. 4,821,757
EP 07 32 376 A2

Hard hydrocarbons have been ground into fine powders and dispersed in water as a slurry. These hard hydrocarbon slurries have certain basic differences when compared to an emulsified hydrocarbon in water. Hard hydrocarbon slurries consist of non-spherical ground particles having median particle sizes of about 18 to 32 microns which are several fold higher compared to a hydrocarbon emulsion in water whose particles sizes are less than about 5 microns (NOTE: confirm). Hard hydrocarbon slurries have a higher rate of settlement and much higher viscosity compared to emulsified hydrocarbon dispersions. Moreover, since hard hydrocarbons do not flow, they cannot be characterized in terms of mean softening point temperatures. The equipment that is needed to make these fine powders and slurries is expensive compared to emulsification equipment. Such hydrocarbons include bottom products obtained from the solvent deasphalting process such as the residual oil solvent extraction process, commonly referred to as the "ROSE" process for recovering various asphaltic materials.

Hydrocarbons above a certain mean softening point have not been emulsified before using methods described in the prior art. There has therefore been a long felt but unfulfilled need for preparing emulsified hydrocarbon dispersions with high mean softening points in water containing as high dispersed (hydrocarbon) phase as possible. Some such hydrocarbons are as follows:

1. Bottom products obtained from the solvent deasphalting process such as the residual oil solvent extraction (ROSE) process for recovering various asphaltic materials.
2. Gilsonite asphalt blends
3. Asphalt polymer blends In the recent years due to environmental awareness followed by strict environmental regulations there is a need for cleaner transportation fuel and a reduction in the use of high sulfur fuel oil. The crude oil is also becoming progressively heavier (lower in API gravity) and higher in sulfur content. The ROSE process upgrades resids by separating the heavy fraction from the lighter fraction using a variety of solvents. A number of feed stocks can be processed through a ROSE unit such as vacuum resid, atmospheric resid, tar sand and other heavy bitumen. The ROSE process produces deasphalted oil (DAO) and asphaltenes. The DAO can be used for a variety of purposes. The asphaltenes have a mean softening point anywhere between 60 to 200° C. These asphaltenes obtained from the deasphalting process are difficult to handle and pump because of their high viscosity and high mean softening point. They have not been previously been emulsified to prepare dispersions in water. The higher mean softening point also prevents it from being used in road paving purposes without blending with other softer materials. In order to handle these asphaltenes and to transport them a reduction is viscosity is required. One possible solution is to make a liquid form of asphaltenes by preparing a colloidal dispersion of asphaltenes in water which are storage stable, stable towards transportation and stable towards pumping which can be used in various applications including use as a liquid fuel.

Gilsonites are naturally occurring bitumen which is pure hydrocarbon containing little or no mineral matter. The mean softening point normally ranges between 150 to 200° C. Table 1 shows the general composition of Gilsonite and how it compares with normal asphalt. There are certain applications in which an emulsified version of a high mean softening point asphaltic material is desirable. Dispersions in water of Gilsonite asphalt blends with high mean softening points are suitable for such applications.

TABLE 1

General composition comparison of Gilsonite and asphalt.

|  | Asphalt % by Weight | Gilsonite % by weight |
| --- | --- | --- |
| Nitrogen | 1.0 | 3.3 |
| Sulfur | 3.0 | 3.0 |
| Asphaltenes | 15 | 50–70 |
| Maltenes | 85 | 30–50 |
| Saturates | 10 | 2 |

Emulsified versions of polymer modified asphalts are widely used in road applications. The use of polymer asphalt blends improves the properties of the road construction materials. There is a limitation in the amount of polymer, such as styrene-butadiene-styrene block co-polymer (SBS), that can be blended into asphalt before emulsification since it increases the viscosity or the mean softening point of the blend to the extent that it cannot be emulsified by methods described in the prior art.

Literature survey indicates that there are no examples of colloidal dispersions of hydrocarbon materials with a mean softening point above about 90° C. as such materials exist in the dispersions. The above mentioned higher mean softening point materials have not been previously emulsified to prepare dispersions in water.

SUMMARY OF THE INVENTION

In accordance with one aspect of the present invention, there is provided a colloidal dispersion of hydrocarbon particles in water. The hydrocarbons have a mean softening point above about 95° C. The dispersions include such hydrocarbons, water and a water soluble dispersion agent.

In accordance with another aspect of the present invention, there is provided a process for forming a colloidal dispersion in water of hydrocarbons having a mean softening point exceeding about 95° C. in said dispersion comprising:

(a) heating petroleum hydrocarbons having a mean softening point exceeding about 95° C. above a temperature of about 200° C.;

(b) heating an aqueous solution of a dispersion agent to a temperature between about 80° C. to the boiling point of the solution; and (c) mixing the heated hydrocarbons from step (a) with the heated aqueous solution of a dispersion agent from step (b) at an elevated pressure and at a high rate of shear so as to form a colloidal dispersion comprising petroleum hydrocarbon particles.

In another aspect of the present invention, there is provided a continuous process for forming a dispersion in water of hydrocarbons having a mean softening point exceeding 95° C. in the dispersion comprising:

(a) initiating and maintaining the flow of an aqueous solution of a dispersion agent having a temperature from about 80° C. to the boiling point of the solution through a high shearing action mixing device, such as a high shear colloid mill, having an inlet through which the dispersion agent is introduced and an outlet from which it is removed;

(b) introducing melted normal asphalt into the mixing device through the inlet of the mixing device with the dispersion agent and mixing the melted normal asphalt with the dispersion agent in the mixing device so as to create an asphalt emulsion and removing the asphalt emulsion from the outlet of the mixing device;

(c) creating a pressure at the outlet of the mixing device in excess of the vapor pressure of the emulsion;

(d) ceasing the introduction of the normal asphalt into the mixing device and in lieu thereof introduce hydrocarbons heated above a temperature of about 200° C. into the mixing device with the aqueous solution of dispersion agent, the hydrocarbons having a mean softening point in colloidal aqueous dispersion exceeding about 95° C.;

(e) mixing the heated hydrocarbons with the aqueous solution of dispersion agent at a temperature of between from about 150° C. to about 170° C. and at a high rate of shear, so as to form a colloidal dispersion comprising petroleum hydrocarbon particles;

(f) cooling the dispersion to a temperature below about 90° C.; and (g) reducing the pressure to atmospheric.

In yet another aspect, the present invention comprises an apparatus for forming a dispersion of hydrocarbons in water which have a mean softening point in the dispersion which exceeds about 95° C. The apparatus comprises:

(a) a high shearing action mixing device having an inlet and outlet;

(b) means for cooling the hydrocarbon dispersion in water having an inlet and outlet with the inlet of the means for cooling being connected to the outlet of the mixing device via a conduit means; and (c) a centrifugal pump having an inlet and outlet with the outlet of the pump being connected to the outlet of the cooling means via a conduit means, the pressure at the outlet of the cooling means being maintained by passing the flow of the dispersion from the outlet of the cooling means backwards through the centrifugal pump.

These and other aspects of the present invention will become apparent upon a review of the following detailed description and the claims appended thereto.

DETAILED DESCRIPTION OF PREFERRED EMBODIMENTS

Figure 1:
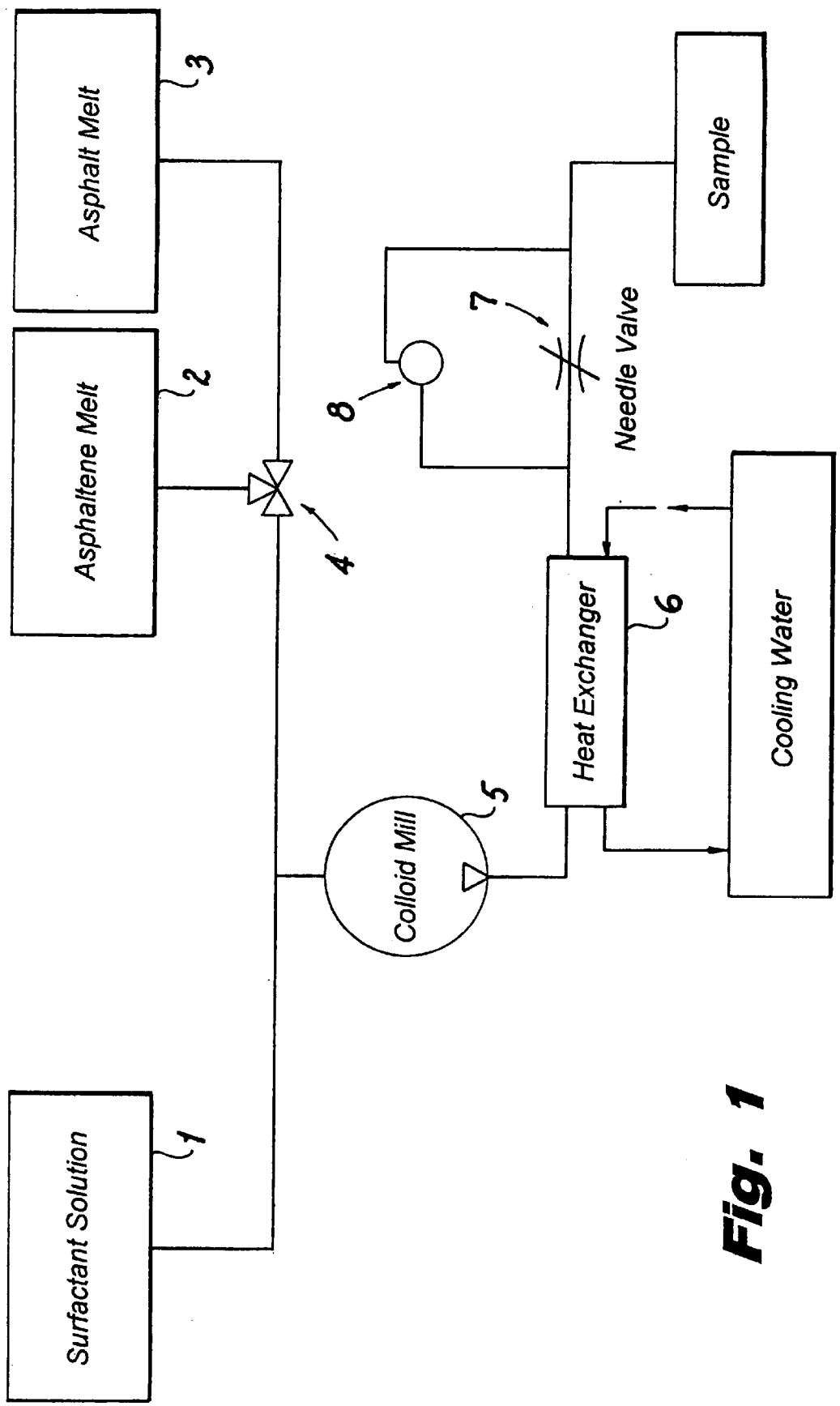
FIG. 1 is a flow diagram describing the process to produce dispersions of petroleum hydrocarbons having a mean softening point above about 95° C.

The colloidal dispersion of the present invention includes petroleum hydrocarbon particles having a mean softening point in the dispersion exceeding about 95° C., a dispersion agent and water. Ionic surfactants are the main components of the dispersion agent. A viscosity thickening agent also referred to as a dispersion stabilizer is another important component of the dispersion agent. The dispersions include hydrocarbon particles that are usually substantially spherically shaped, whose preferred median diameter is below about 4.5 microns (10.3 microns if Gilsonite) and about 90% and preferably about 95% of the particles are below a mean particle size diameter of about 60 microns. These dispersions are storage stable, stable towards transportation, and stable towards pumping, and show a positive charge. The dispersion agent will usually comprise from about 0.2% to about 2% by weight of the dispersion and the hydrocarbon particles are generally more than 65% by weight of the dispersion. The following is a typical composition of the colloidal dispersion of the present invention given in weight %:

| | |
|---|---|
| Hydrocarbon (Mean softening point between about 95° C. to about 120° C.): | 55% to 75% |
| Water | 30% or more |
| Surfactants | 1.5% or less |
| Stabilizers | 0% to 1.0% |

The advantages of the above dispersions over prior art are as follows:

1. The dispersions contain higher mean softening point hydrocarbons without the addition of solvents or flux which provide significant cost savings.

2. The storage stability of these dispersions is excellent compared to normal hydrocarbon dispersions in water since the higher mean softening point hydrocarbon particles unlike soft hydrocarbon particles do not deform and coalesce into bigger particles which causes destabilization of the dispersion.

3. The dispersions contain higher dispersed phase content and thus minimize transportation costs.

Suitable hydrocarbons include Rose asphaltenes, Gilsonite asphalt blends, and polymer modified asphalts with a mean softening point above about 950° C. The Rose asphaltenes have a mean softening point between 60 and 200° C. The mean softening point is determined according to the ASTM test method (D36). The asphaltenes obtained from the deasphalting process are difficult to handle and pump in view of their high mean softening point. These hydrocarbons have to be heated to higher temperatures than normal before emulsification due to their high mean softening point. This would increase the temperature of the resulting dispersion in water much above the boiling point of water. This requires elevated pressure to prevent water from boiling off and the required pressure is necessary from the very beginning of the emulsification process.

The dispersion agents used to produce the dispersions of the present invention can be classified into two categories: a) water soluble surfactants (also referred to as emulsifiers), which include anionic or cationic surfactants, and b) stabilizers. Cationic surfactants with the following general formulae can be used in these dispersions.

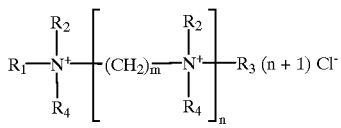

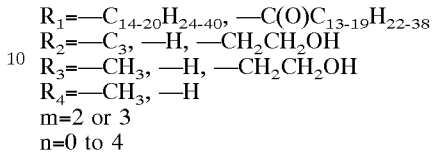

$R_1 = -C_{14-20}H_{24-40}, -C(O)C_{13-19}H_{22-38}$
$R_2 = -C_3, -H, -CH_2CH_2OH$
$R_3 = -CH_3, -H, -CH_2CH_2OH$
$R_4 = -CH_3, -H$
m=2 or 3
n=0 to 4

The surfactant molecules have at least one alkyl substituent having a hydrocarbon chain having a chain length distribution between from 14 to 20 carbon atoms. The molecules also have one or more amine functionality which serve as the hydrophilic sites in the molecule. These surfactants result in dispersions which show a positive charge in the particle charge test (ASTM D 244). Surfactants can be used at a dosage level of from about 0.2% to about 1.5% by the weight of the emulsion.

Suitable cationic surfactants include 60% tallow diamine+40% tallow primary amine; 75% ethoxylated tallow diamine quaternary ammonium chloride+25% lignin amine; tallow di-quaternary ammonium chloride; 67% tallow mono-quaternary ammonium chloride+33% lignin amine; and 67% tallow di-quaternary ammonium chloride+33% lignin amine.

Suitable anionic surfactants include 75% tallow mono-quaternary ammonium chloride+25% lignin amine; tallow diamine; 60% tallow diamine+40% lignin amine; dodecylbenzene sulphonate; and crude tall oil fatty acids.

Polymeric and high molecular weight compounds which enhance stability by various factors including viscosity modification of the continuous phase are suitable for use and may be used as stabilizers in the dispersions of the present invention. Suitable stabilizers include products such as guar gum, xanthan gum, chemically modified lignins, etc. Stabilizers can be used in combination with the surfactants in the dispersions of the present invention. These additives enhance the storage stability of the present dispersions. Stabilizers can be used at a suitable dosage level of from about 0.1% to about 1.0% by the weight of the emulsion.

It is important to note that the composition of the present invention comprises hydrocarbon particles having a mean softening point as they exist in the water dispersion exceeding about 95° C., preferably between a mean of about 95° C. to about 120° C., and which will usually be substantially spherically shaped. This is distinguished from hydrocarbon particles which may have a mean softening point exceeding about 95° C. in a pure state, but when incorporated into a water dispersion with fluxant oils or solvents or powdered and made into a slurry with softer hydrocarbon emulsions will have a mean softening point below 95° C. The term "mean softening point" is understood to mean that determined by evaporating water from the emulsion and measuring the mean softening point of the residue left by test method ASTM D36.

The process for producing the dispersions of the present invention can be a continuous process using a modified emulsion plant (see FIG. 1). The modified laboratory emulsion plant has the capabilities of establishing a pressure of 85 to 120 psi at the outlet of the mill before introduction of the high mean softening point hydrocarbon.

The high softening point hydrocarbons are maintained at a temperature above about 200° C. which will reduce its viscosity to about 50 to 500 centipoise. The surfactants and stabilizers are dissolved in a calculated quantity of water (30–35 wt %) at a temperature of about 60° C. with stirring. The aqueous solution is adjusted to the required pH (pH 2–6) using 36% hydrochloric acid. A viscosity stabilizer may be added to the solution. This solution is transferred to the soap pot in the laboratory emulsion plant and further heated to the required temperature. The temperature of the soap solution is maintained between from about 80° C. to the boiling point of the solution.

With reference to FIG. 1, the process can be started by introducing the hot soap (dispersion agent) solution, having a temperature from about 80° C. to the boiling point of the solution from tank 1 into colloidal mill 5. Then melted normal asphalt (AC-20, mean softening point 40–50° C.) maintained at a temperature from 150° C. to 180° C. is introduced from tank 3 into mill 5 along with the soap solution to produce an asphalt in water emulsion. The emulsion flow is passed from mill 5 to cooling means or heat exchanger 6 where its temperature is reduced to below about 95° C. The emulsion flow and the opening in restricting valve 7 may be adjusted to create a pressure in excess of the vapor pressure of the emulsion, probably about 85 to 120 psi at the outlet of colloidal mill 5. Alternatively, the pressure may be maintained by passing the emulsion flow backwards through centrifugal pump 8 which creates the desired pressure by pumping against the direction of liquid flow. Although the pressure is created at the outlet of heat exchanger 6, the pressure actually controlled would be that at the outlet of colloid mill 5. Once the pressure is established asphalt is switched with asphaltenes or other hydrocarbons as described above having a mean softening point above 95° C. from asphaltene melt tank 2 heated above a temperature of about 200° C. to produce a dispersion of asphaltenes in water. Three way valve 4 is employed to effect the switch between tanks 2 and 3. The emulsification temperature is maintained between 120° C. to 170° C.

The colloidal mill creates a dispersion of high mean softening point hydrocarbon droplets in water. It is believed that the hydrophobic hydrocarbon chains of the surfactant dissolve in the hydrocarbon droplets of the emulsion. The charged hydrophilic sites of these surfactants have an affinity for water and stay at the surface of the hydrocarbon droplets. The electrostatic repulsion between the like charges on the surface of the two droplets plays a major role acting as barriers in preventing the coalescence of these droplets which would result in separation of these two phases. The dispersions pass through cooling units which cool the dispersions to a temperature below about 90° C. (preferably between 30° C. to 85° C.) before the pressure is released at the outlet of the heat exchangers.

By "substantially spherical" with regard to the hydrocarbon droplets, what is meant is the spherical orientation that is assumed at the high temperatures in the colloid mill which may be perfectly spherical or deviate to some extent such as to an ellipsoidal shape. The shape will be retained when the emulsion is cooled, even when subjected to conditions of high shear such as when being pumped.

This process goes beyond the previous art in the following respects:

1. This is a novel two step high pressure emulsification/dispersion process. The higher mean softening point hydrocarbons have to be heated to a higher temperature compared to soft hydrocarbons which results in a temperature which is higher than the boiling point of water for the mixture of hydrocarbon and surfactant solution. In such cases a pressurized system is necessary to prevent water from boiling off. In a conventional one step continuous emulsification system there is no pressure at the beginning of the emulsification process. The flow of emulsions is necessary to create the required pressure. In prior art processes, hard hydrocarbons in the molten state when mixed with surfactant solution immediately solidify due to evaporation of water and cooling since there is no pressure at the beginning of the emulsification process. This clogs the whole system and prevents any further emulsification. In the present process, in the first step a pressure in excess of the vapor pressure of the emulsion (about 85 to about 120 psi) is established at the outlet of the colloidal mill by producing normal asphalt (mean softening point 40° C. to 50° C.) emulsion. In the second step high mean softening point hydrocarbons heated to elevated temperatures are introduced into the colloidal mill substituting normal asphalt.

2. In the case of higher mean softening point hydrocarbons it is important that the mill temperature is much above the mean softening point of the hydrocarbon. When hydrocarbons heated to elevated temperature are brought into contact with surfactant solutions in water the hydrocarbons attain a temperature which is lower than their mean softening point. The initial hydrocarbons reaching the mill get cooled and attain a viscosity which is much below the limit for emulsification. This clogs the system and prevents any further emulsification. In the present process the temperature of the colloidal material is raised to a temperature in between the temperature of the surfactant solution and the final emulsification temperature by producing normal asphalt emulsion before introduction of the high mean softening point hydrocarbons.

3. Not all surfactants, especially the non-ionic surfactants, have the necessary emulsification capability at temperatures much above the boiling point of water and also do not provide the necessary stability to the dispersions at those temperatures. Even among ionic surfactants only certain surfactants were identified to be capable of emulsifying and protecting the high mean softening point hydrocarbons at the emulsification temperatures (150±150 C.).

A careful selection of surfactants is necessary to ensure that the dispersion agents will be capable of emulsifying the high mean softening point hydrocarbons at these high temperatures.

The following tests were designed to evaluate the storage stability, transportation stability, and stability towards pumping of the dispersions.

Storage Stability

The natural tendency of the dispersions is to separate into two phases by the process of coalescence of the high mean softening point hydrocarbon particles. There are two factors which prevent this type of coalescence. First, the hydrophilic sites of the surfactants stay at the surface of the high mean softening point hydrocarbon particles. These provide a net positive charge for the high mean softening point hydrocarbon particles in the case of a cationic dispersion. The electrostatic repulsive force between positively charged droplets provides a barrier for coalescence. Second, since the high mean softening point hydrocarbon particles are solids, at ambient temperatures they do not deform as in the case of liquids, wherein two particles can more easily coalesce into one bigger particle. Thus the hardness of the hydrocarbons provide higher storage stability to its dispersions compared to soft hydrocarbon dispersions. The following tests were used to test the stability of the emulsion.

a. Particle Size Distribution

The particle size distribution represents a measure of the colloidal nature of the dispersions. If the particle size distribution is much above normal the dispersions will not be storage stable. A suitable particle size distribution has a median below about 4.5 microns (10.3 microns for Gilsonite) and 90% of particles being less than about 60 microns.

b. Storage Stability Test

The storage stability test is performed by pouring the dispersion into a 500 ml graduated cylinder and letting it stand for 24 hours. The difference in the percent asphaltene residue between the top 50 ml and the bottom 50 ml is measured. The lower the difference the better is the stability of the dispersion. A difference of less than from about 3 to 4% is considered acceptable.

c. Sieve Test

In the sieve test a desired amount of dispersion is filtered through a 4 inch by 4 inch #20 mesh tared wire sieve. The amount of residue on the screen reflects the stability of the dispersion. Hydrocarbons that are not emulsified and broken dispersions show large amounts of residue on the sieve. A residue below about 1% is considered to pass the sieve test.

d. Transportation Stability—Shaker Test

The dispersions once produced need to be transported in order to be used for certain purposes. A shaker test was designed to simulate the conditions of transporting in a tank truck. 100 g of dispersion are shaken in a Burnell Wrist Action Shaker for 24 hours and then the dispersions are filtered through a #50 mesh screen. The amount of broken dispersion (residue) on the screen and in the bottle gives a measure of its stability towards transportation. A dispersion which gives a residue below 1% of the weight of the dispersion is considered to pass the shaker test.

e. Stability Towards Pumping—Pump Test

The dispersions should be stable when pumped in order to be used for transporting to a desired location. An aspect of this invention is to create a liquid form of the asphaltenes that can be stored, transported, and can be pumped. In the pump test the dispersion is pumped using a progressive cavity pump running at a speed of 500 rpm. About 2000 g of dispersion is first filtered through a 50 mesh screen and then placed in one of two reservoirs. The dispersion is pumped through a #50 mesh screen from one reservoir to the other over a period of about 18 minutes. A dispersion which can be pumped for 18 minutes and collects less than 10 g residue on the screen is considered to pass the pump test. The pump test is designed in such a way that the test conditions are more severe than what would be encountered in the field.

To determine % Residue a known amount of dispersion is weighed and evaporated at a temperature of about 130–150° C. to remove all the water. The resulting residue is weighed from which the percent hydrocarbon residue is calculated.

The above Storage stability and sieve tests and % residue determination are conducted according to ASTM D244 test procedures for testing dispersed asphalts.

The invention will be further illustrated with reference to the following specific examples. It is understood that these examples are given by way of illustration and are not meant to limit the disclosure or the claims to follow.

The asphaltenes used in the examples were obtained from Exxon and Cenex. The properties of the asphaltenes that were used in the examples of the present invention are listed in Table 2. No stabilizer was employed.

Gilsonite asphalt blend used in the experiments was obtained from American Gilsonite. The blend had a mean softening point of 119° C. and had a viscosity of 4900 cps at 176° C.

TABLE 2

Properties of Asphaltenes

| | Asphaltene #1 Exxon | Asphaltene, #2 Exxon | Asphaltene, #3 Exxon | Asphaltene #4 Cenex |
|---|---|---|---|---|
| Ring and Ball Softening Point, ° C. | 107 | 96 | 118 | 104 |
| Density, g/mL | — | — | — | 1.10 |
| Sulfur wt % | 5.2 | 5.4 | 6.0 | 5.3 |
| Nitrogen wt % | 1.6 | 0.8 | 0.5 | 0.9 |
| Carbon wt % | — | 84.4 | 85.0 | 82.9 |
| Hydrogen wt % | — | 8.9 | 8.5 | 9.0 |
| Oxygen wt % | — | 0.5 | — | — |
| $nC_7$ insols Asphaltenes wt % | 21.4 | 34 | 24.4 | — |
| Ni ppm wt | 133 | 120 | 61 | 130 |
| V ppm wt | 449 | 400 | 243 | 400 |

EXAMPLES 1–5

Examples 1–5 were prepared in accordance with the process conditions and ingredients listed in Table 3 and the following experimental procedure. The asphaltene was melted in drums using a drum heater belt and then poured into the asphaltene reservoir and heated to the asphaltene temperature shown in Table 3. The soap solution was prepared by dissolving the surfactant in water followed by adjusting the pH with 36% hydrochloric acid. The soap solution was added to the soap reservoir and heated to the temperature shown in Table 3. The mill was heated to a temperature similar to that of the soap temperature.

The mill gap was set at 0.020 inches. The process was first started by introducing the hot soap solution into the colloidal mill. Then normal asphalt (AC-20) at 150° C. was introduced into the mill along with the soap solution to produce an asphalt in water emulsion. The emulsion flow and the opening in the restricting valve was adjusted to create a pressure of from about 85 to 95 psi at the outlet of the colloidal mill. Once the pressure was established asphalt was switched with the harder asphaltenes to produce the dispersion of asphaltenes in water. The dispersions were maintained at a temperature of from about 145° C. to 150° C. The cooling units cooled the dispersions to about 80° C. to 85° C. before exiting the pressure control valves. The dispersions were further cooled by leaving at ambient temperature. The dispersions were produced at a rate of about 4 to 8 liters per minute.

EXAMPLES 6–12

Examples 6–12 were prepared in accordance with the process conditions and ingredients listed in Table 3. The surfactant solution was prepared as described in the procedure noted above and heated to the temperature shown in Table 3. The hot soap solution was introduced into the colloidal mill. Then normal asphalt (AC-20) heated to about 150° C. to 180° C. was introduced into the mill along with the soap solution to produce an asphalt in water emulsion. The pressure control device was adjusted to create a pressure of about 110 to 120 psi at the outlet of the colloidal mill. Asphalt was switched with the high mean softening point hydrocarbon to produce the dispersion in water. The emulsification temperature was maintained at about 150° C. to 170° C. The cooling units cooled the dispersions to about 30° C. to 60° C.

EXAMPLES 13–16

Examples 13–16 were prepared in accordance with the process conditions and ingredients listed in Table 3. The surfactant solution was prepared by dispersing the surfactant in water followed by adjusting the pH with 40% sodium hydroxide solution. The surfactant solution was added to the soap reservoir and heated to the temperature shown in Table 3. The hot soap solution was introduced into the colloidal mill. Then normal asphalt (AC-20) heated to about 150° C. to 180° C. was introduced into the mill along with the soap solution to produce an asphalt in water emulsion. The pressure control device was adjusted to create a pressure of about 110 to 120 psi at the outlet of the colloideal mill. Asphalt was switched with the high mean softening point hydrocarbon to produec the dispersion in water. The emulsification temperature was maintained at about 150° to 170° C. The cooling units cooled the dispersions to about 30° C. to 60C.

TABLE 3

Process conditions and ingredients for production of asphaltene dispersions

| Example Run # | Asphaltene | Softening point C. | Surfactant | pH of Soap solution | Asphaltene Temperature C. | Soap Temperature C. |
|---|---|---|---|---|---|---|
| 1 | #1 | 107 | 0.5% A | 2.5 | 225 | 90 |
| 2 | #1 | 107 | 2.0% B | 2.5 | 225 | 90 |
| 3 | #1 | 107 | 1.5% C | 7.2 | 225 | 90 |
| 4 | #1 | 107 | 1.5% D | 2.5 | 225 | 90 |
| 5 | #1 | 107 | 1.5% E | 2.5 | 225 | 90 |
| 6 | #2 | 96 | 2.0% F | 2.5 | 220 | 90 |
| 7 | #2 | 96 | 1.5% F | 3.0 | 215 | 88 |
| 8 | #2 | 96 | 1.0% F | 3.0 | 215 | 88 |
| 9 | #3 | 118 | 0.4% G | 2.2 | 215 | 96 |
| 10 | #3 | 118 | 0.5% G | 2.1 | 224 | 92 |
| 11 | #4 | 104 | 0.3% G | 2.2 | 216 | 96 |
| 12 | Gilsonite | 121 | 0.7% H | 1.9 | 227 | 98 |
| 13 | Gilsonite | 121 | 0.5% I | 12.0 | 218 | 97 |
| 14 | #4 | 103 | 0.4% I | 11.7 | 218 | 85 |
| 15 | #2 | 96 | 0.7% I | 12.5 | 214 | 85 |
| 16 | #2 | 96 | 0.5% J | 12.6 | 213 | 85 |

The dispersing agents identified as A, B, C, D and E comprised cationic surfactants and F, G, H, I and J anionic surfactants, having the following compositions:

| Surfactant | Composition |
|---|---|
| A | 60% tallow diamine + 40% tallow primary amine |
| B | 75% ethoxylated tallow diamine quaternary ammonium chloride + 25% lignin amine |
| C | tallow di-quaternary ammonium chloride |
| D | 67% tallow mono-quarternary ammonium chloride + 33% ligninamine |
| E | 67% tallow di-quarternary ammonium chloride + 33% ligninamine |
| F | 75% tallow mono-quarternary ammonium chloride + 25% ligninamine |
| G | tallow diamine |
| H | 60% tallow diamine + 40% lignin amine |
| I | dodecylbenzene sulphonate |
| J | crude tall oil fatty acids |

TABLE 4

Properties of the asphaltene dispersions in water

| Example Run # | % Residue | Sieve Test % | Storage Stability test (%) | Particle size Median Diameter | Pump Test | Shaker Test (%) |
|---|---|---|---|---|---|---|
| 1 | 66.8 | <0.01 | 1.1 | NA | NA | NA |
| 2 | 66.0 | <0.01 | 1.6 | NA | NA | NA |
| 3 | 65.7 | <0.01 | 3.9 | NA | NA | NA |
| 4 | 65.2 | <0.01 | 1.6 | NA | NA | NA |
| 5 | 65.1 | <0.01 | 1.7 | NA | NA | NA |
| 6 | 66.0 | 0.02 | 3.7 | 1.84 | Pass | 0.02 |
| 7 | 70.0 | 0.03 | 1.8 | 2.41 | Pass | 0.09 |
| 8 | 67.0 | 0.06 | 2.8 | 2.54 | Pass | 0.30 |
| 9 | 69.4 | NA | NA | 2.3 | Pass | NA |
| 10 | 69.0 | NA | NA | 1.7 | Pass | NA |
| 11 | 69.7 | NA | NA | 2.62 | Pass | NA |
| 12 | 65.2 | NA | NA | 10.3 | NA | NA |
| 13 | 67.8 | NA | NA | 2.3 | NA | NA |
| 14 | 67.2 | NA | NA | 2.3 | Pass | NA |
| 15 | 67.6 | NA | NA | 1.4 | Pass | NA |
| 16 | 65.5 | NA | NA | 1.5 | NA | NA |

The asphaltene dispersions produced were subjected to the tests outlined in sections a to e. The particle size median of the dispersions, where determined, was done using a Coultor LS-130 particle size analyzer. Table 4 includes a listing of the results from the tests. For examples 12, 13 and 16 data was obtained only for Particle size and % Residue, but the values obtained are indicative that the results for Sieve Test, Stability Test, Pump Test and Shaker test would be satisfactory.

The data, as set forth in Table 4, indicates the colloidal dispersions of the invention to be stable with regard to storage, transportation and pumping. For the first time such dispersions of desired stability have been obtained for hydrocarbon particles having a mean mean softening point in the dispersion exceeding about 95° C.

While the invention has been described with preferred embodiments, it is to be understood that variations and modifications are to be considered within the purview and the scope of the claims appended hereto.

What is claimed is:

1. A continuous process for forming a colloidal dispersion in water of hydrocarbons having a mean softening point exceeding about 95° C. in said dispersion comprising:

(a) initiating and maintaining the flow of an aqueous solution of a dispersion agent having a temperature from about 80° C. to the boiling point of the solution through a high energy mixing device having an inlet through which said solution of dispersion agent is introduced and an outlet from which it is removed;

(b) introducing melted normal asphalt into said mixing device through said inlet of said mixing device with said dispersion agent and mixing said melted normal asphalt with said dispersion agent in said mixing device so as to create an asphalt emulsion and removing said asphalt emulsion from said outlet of said mixing device;

(c) creating a pressure at said outlet of said mixing device in excess of the vapor pressure of the emulsion;

(d) ceasing the introduction of said normal asphalt into said mixing device and in lieu thereof introduce hydrocarbons heated above a temperature of about 200° C. into said mixing device with said aqueous solution of dispersion agent, said hydrocarbons having a mean softening point in colloidal aqueous dispersion exceeding about 95° C.;

(e) mixing said heated hydrocarbons with said aqueous solution of dispersion agent and maintaining the mixture at a temperature of between from about 120° C. to about 170° C., so as to form a colloidal dispersion comprising petroleum hydrocarbon particles;

(f) cooling said dispersion to a temperature below about 90° C.; and (g) reducing the pressure to atmospheric.

2. The process of claim 1, wherein said mixing is performed in a colloidal mill.

3. The process of claim 1, wherein said mean softening point is between about 95° C. to about 120° C.

4. The process of claim 1, wherein about 90% of said hydrocarbon particles have a mean particle size diameter less than about 60 microns.

5. The process of claim 1, wherein said hydrocarbon particles have a median particle diameter below about 4.5 microns.

6. The process of claim 1, wherein said dispersion agent comprises a surfactant which is less than about 1.5% by weight of said dispersion.

7. The process of claim 1, wherein said dispersion comprises a cationic or anionic surfactant.

8. The process of claim 1, wherein said dispersion agent comprises a cationic surfactant.

9. The process of claim 8 wherein said cationic surfactant has the formula:

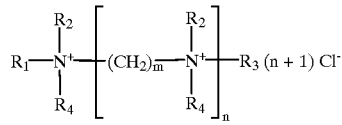

wherein
$R_1 = -C_{14-20}H_{24-40}, -C(O)C_{13-19}H_{22-38}$
$R_2 = -CH_3, -H, -CH_2CH_2OH$
$R_3 = -CH_3, -H, -CH_2CH_2OH$
$R_4 = -CH_3, -H$
m=2 or 3
n=0 to 4 the surfactant molecule having at least one alkyl substituent having a hydrocarbon chain having a chain length distribution between from 14 to 20 carbon atoms and at least one amine functionality which serves as a hydrophilic site in the molecule.

10. The process of claim 1, wherein said composition comprises from about 55% to 75% by weight or less of said hydrocarbon particles, about 30% by weight or more of water and from about 0.2% to about 1.5% by weight or less of cationic or anionic surfactant and from about 0% to about 1.0% by weight of stabilizer.

11. The process of claim 1, wherein the hydrocarbon particles are substantially spherical.

12. The process of claim 1 wherein said normal asphalt has a softening point of 40° C. to 50 ° C.

13. The process of claim 1, wherein the pressure at said outlet of said mixing device in step (c) is from about 85 psi. to about 120 psi.

14. The process of claim 1, wherein said hydrocarbon is selected from the group consisting of asphaltenes, Gilsonite asphalt blends, polymer modified asphalts and mixtures thereof.

15. An apparatus for forming a dispersion of hydrocarbons in water, said hydrocarbons having a mean softening point in said dispersion exceeding about 95° C., comprising:

(a) a high energy mixing device having an inlet and outlet;

(b) means for cooling said hydrocarbon dispersion in water having an inlet and outlet with said inlet of said means for cooling being connected to said outlet of said mixing device via a conduit means; and (c) a centrifugal pump having an inlet and outlet with said outlet of said pump being connected to said outlet of said cooling means via a conduit means, the pressure at said outlet of said cooling means being maintained by passing the flow of said dispersion from said outlet of said cooling means backwards through said centrifugal pump.

16. The apparatus of claim 15, wherein said high energy mixing device is a colloidal mill.

* * * * *